April 12, 1932.　　　D. NETTENSTROM　　　1,853,171
UNIVERSAL COUPLING
Filed Nov. 8, 1929
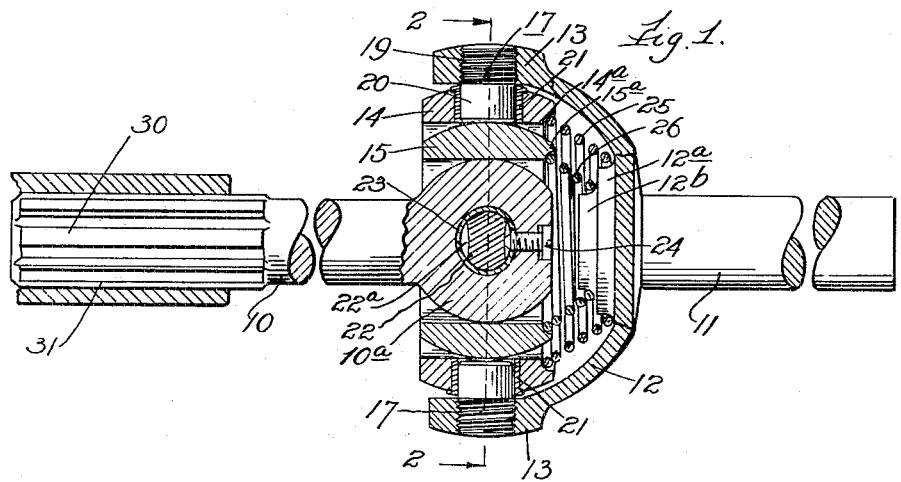
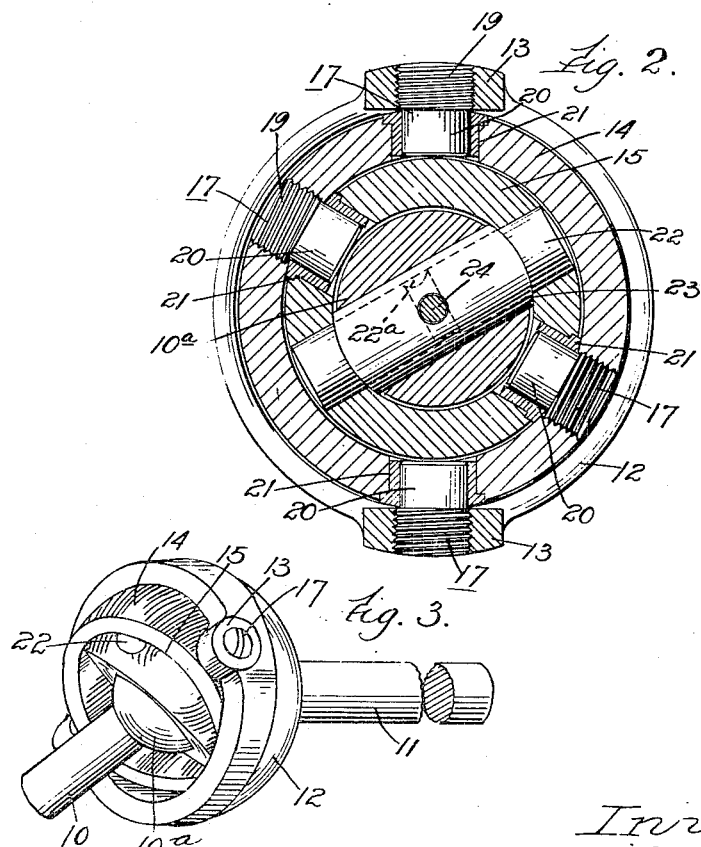
Inventor
David Nettenstrom
by [signature]
his Attorneys.

Patented Apr. 12, 1932

1,853,171

UNITED STATES PATENT OFFICE

DAVID NETTENSTROM, OF CHICAGO, ILLINOIS, ASSIGNOR OF ONE-HALF TO HARRY C. WANNER, OF CHICAGO, ILLINOIS

UNIVERSAL COUPLING

Application filed November 8, 1929. Serial No. 405,553.

This invention pertains to couplings for transmitting rotary motion from a driving shaft to a driven shaft, and more particularly to couplings of the "universal type" for shafts which are required to be disposed in angular relation to each other. It is a main object of this invention to provide a coupling of improved and simplified construction, adapted for maintaining a substantially constant or uniform angular velocity in the driven shaft throughout a relatively wide range of angular adjustment. Another object is to provide a universal coupling that is flexible and relatively compact in construction, which is especially adaptable for use in connection with automobile vehicles employing the "front end drive" in which the steering wheels are driven, and wherein the angular relation of the driving and driven shaft is, therefore, undergoing a frequent change. A further object is to provide an improved universal coupling that is relatively flexible, noiseless and adapted to substantially obviate vibration of itself or adjacent parts. A still further object of this invention is to provide an improved coupling of durable construction, capable of efficiently transmitting rotary motion under relatively great driving torque from one shaft to another. It consists in certain features and elements of construction, in combination, as herein shown and described and as indicated by the claims.

In the drawings:

Figure 1 is a longitudinal sectional view of the coupling embodying the present invention shown connecting a driving and a driven shaft.

Figure 2 is a transaxial sectional view taken substantially as indicated at the line 2—2 on Figure 1.

Figure 3 is a perspective view showing the coupling with the driving and driven shafts disposed at an angular position of adjustment.

For the purpose of illustration it may be understood that the shaft indicated at 10 is the drive shaft and is connected by the coupling embodying the present invention to the driven shaft indicated at 11. Rigidly provided at the coupling end of the driven shaft, 11, is a yoke member, 12, which, as shown, is cup-shaped and is provided at its rim with a pair of diametrically opposite bearing lugs, 13. Mounted in said yoke are a pair of nested rings, 14 and 15, respectively, which are pivotally connected at diametrically opposite points of rotation relative to each other and one by the other. The outermost ring, 14, is pivoted at diametrically opposite points in the lugs, 13, of the yoke member, while the innermost ring, 13, is pivoted at diametrically opposite points to the spheroid shaped end, 10ª, of the drive shaft, 10. As illustrated in Figure 2, the axes of the respective pivotal connections are disposed in angular relation to each other and preferably, as shown, equidistantly from each other, in amounts approximately 60 degrees, in successive order commencing with the pivotal connection of the inner ring to the drive shaft. This arrangement of the pivotal connections provides a relatively flexible connection for the smooth transmission of rotary movement from the drive shaft to the driven shaft, obviating vibration or the "slapping" action usually incident thereto in ordinary universal joints when the drive shaft and driven shaft are disposed at a considerable angle with respect to each other.

The pivotal connections between the respective rings and between the larger ring and the yoke, 12, are effected by trunnions indicated at 17 having their outer ends formed like headless set screws at 19, and the opposite ends reduced to form cylindrical studs, 20. As will be apparent from Figure 2, these trunnions are threaded into the yoke and the larger ring member, 14, respectively, with their respective cylindrical stud portions, 20, projecting inwardly into and journalled in the outer and inner rings. To insure against wear, the inner and outer rings are provided with bushings, 21, which form bearings for the cylindrical studs, 20, of the trunnions.

The pivotal connection between the inner ring and the drive shaft includes a solid pin, 22, which extends transaxially through the inner ring and the spheroidal end, 10ª, of the drive shaft with the outer ends of said pin serving as trunnions freely rotatable in said inner ring, 15. Extending transversely through the end, 10ª, of the drive shaft is a sleeve member, 23, adapted to provide a snug fit for the pin. The sleeve, 23, has its ends rounded to the curvature of the inside diameter of the inner ring and is dimensioned lengthwise to support the spheroidal end of the drive shaft in spaced and concentric relation to the inner ring.

The pin, 22, is formed with the central peripheral groove, 22ª, in which is seated the end of a set screw, 24, which extends through the spheroidal end of the drive shaft, and through said sleeve, 23, for locking said sleeve to the pin, 22. Disposed within the yoke, 12, are two concentrically arranged spiral coil springs, 25, 26, respectively, one edge of the outer spring, 25, engaging in a groove, 14ª, in the rear face of the outer ring, while its opposite end rests on a seat, 12ª, formed in the yoke member, 12; and the coil spring, 26, having one end engaging in a groove, 15ª, of the rear face of the inner ring while its opposite end is supported on the seat, 12ᵇ, of the yoke member. It will be apparent that these coil springs, 25 and 26, tend to yieldingly oppose any movement of the respective rings about their pivotal axes, and when the rings have been shifted about said axes so as to compress the respective springs, the springs will tend to cause their return to normal position, perpendicular to the axis of the driven shaft. Furthermore, these springs serve to cushion the shock and eliminate any "slap" incident to abrupt angular adjustment of the drive shaft with respect to the driven shaft, or vice versa.

The outer contour of the rings, 14 and 15, is preferably of convex cross section, as seen in Figure 1, so as to secure maximum cross sectional area while still affording clearance for relative rotation of the parts with respect to each other and to the yoke member; and likewise the spheroid shape of the end, 10ª, of the drive shaft affords maximum cross sectional area while also permitting clearance for free rotation inside of the inner ring, 15.

The coupling embodying the present invention is relatively compact, durable and capable of transmitting full torque from one shaft to the other at all angular positions of adjustment of said shafts. The pivotal connections of the coupling are such that rotary motion may be transmitted from one shaft to another at a substantially uniform or constant velocity. My improved coupling is particularly adaptable for use in connection with automotive vehicles of the "front wheel drive" type in which the steering wheels of the vehicle are driven. In such use, the coupling is subjected to continual re-adjustment in response to variations in position of the drive shaft with respect to the driven shaft, and with present day design of such vehicles the coupling unit to be satisfactory must be compact so as to occupy a relatively small amount of space. When the coupling is used as the driving medium for the front wheels of an automotive vehicle, some accommodation in the length of the connection must be made for irregularities in the roadbed which will cause differences in height of the wheel axis with respect to the drive shaft bearing; accordingly the rear end of the drive shaft, 10, is shown splined as indicated at 30, so as to be capable of axial movement in its cooperatively splined driving sleeve, 31, which may be journalled on the chassis in any suitable manner.

It will be manifest from the drawings that my improved coupling is capable of being driven in either direction; hence, if desired, the force may be transmitted either from the yoke member through the rings to the other shaft, or in the manner described in connection with Figure 1 of the drawings.

I claim:

1. In a device of the class described, the combination of a pair of power shafts adapted to be disposed at an angle to each other, a yoke provided at the end of one of said shafts, and a multiplicity of driving rings disposed in nested relation in said yoke, each ring being pivotally connected to an adjacent ring at diametrically opposite points, the outer ring being pivotally connected to said yoke at diametrically opposite points, and the inner ring being pivotally connected to the adjacent end of the other shaft; the axis of each pivotal connection being disposed at an angle to all the others.

2. In a device of the class described, the combination of a pair of shafts adapted to be arranged at various angular positions with relation to each other, a coupling forming a driving connection between the shafts, said coupling including a yoke provided at the end of one of the shafts, a pair of nested rings pivotally connected at diametrically opposite points for rotation relative to each other and for driving one by the other, the outer ring being pivotally connected at diametrically opposite points to said yoke, and the inner ring being pivotally connected at diametrically opposite points to the adjacent end of the other shaft, said pivotal connections being disposed with their axes spaced apart by substantial angular distances in successive order.

3. In the construction defined in claim 2, the axes of said pivotal connections being spaced apart by equal angular distances.

4. In a device of the class described, the combination of a pair of shafts adapted to be arranged at various angular positions with relation to each other, a coupling forming a driving connection between the shafts, said coupling including a yoke provided at the end of one of the shafts, a pair of nested rings pivotally connected at diametrically opposite points for rotation relative to each other and for driving one by the other, the outer ring being pivotally connected at diametrically opposite points to said yoke, and the inner ring being pivotally connected at diametrically opposite points to the adjacent end of the other shaft, the axis of each of said pivotal connections being disposed at an angle to the other, and means operating against one of said rings tending to yieldingly maintain it co-axial with respect to the shaft provided with the yoke.

5. In a device of the class described, the combination of a pair of shafts adapted to be arranged at various angular positions with relation to each other, a coupling forming a driving connection between the shafts, said coupling including a yoke provided at the end of one of the shafts, a pair of nested rings pivotally connected at diametrically opposite points for rotation relative to each other and for driving one by the other, the outer ring being pivotally connected at diametrically opposite points to said yoke, and the inner ring being pivotally connected at diametrically opposite points to the adjacent end of the other shaft, the axes of each of said pivotal connections being disposed at an angle to the others, and means tending to yieldingly maintain said rings in co-axial relation to each other.

6. In the construction defined in claim 5, said means consisting of two concentrically disposed coil springs reacting between the yoke and the respective rings.

7. In a device of the class described, the combination of a pair of shafts adapted to be arranged at various angular positions with relation to each other, a coupling forming a driving connection between the shafts, said coupling including a yoke provided at the end of one of the shafts, a pair of nested rings pivotally connected at diametrically opposite points for rotation relative to each other and for driving one by the other, the outer ring being pivotally connected at diametrically opposite points to said yoke, and the inner ring being pivotally connected at diametrically opposite points to the adjacent end of the other shaft, the axis of each of the pivotal connections being disposed at an angle to the others, and the pivotal connection between the inner ring and the shaft including a pivot pin extending diametrically through said shaft and ring,—a sleeve surrounding said pin and extending through the shaft with its ends engaging the inner surface of the inner ring for maintaining the same in spaced concentric relation to the shaft, and means for rigidly connecting said pin and sleeve.

8. In the construction defined in claim 2, the outer surface of said rings being of convex cross-section to obtain maximum cross-sectional area while affording clearance in rotation of one part relative to the other.

9. In a device of the class described, the combination of a pair of connected shafts adapted to be swung into different positions extending at various angles to each other, a coupling forming the driving connection between the shafts, said coupling including a yoke provided at the end of one of said shafts, a pair of nested rings pivotally connected together at diametrically opposite points, the outer ring being pivoted at diametrically opposite points to said yoke and the inner ring being pivoted at diametrically opposite points to the end of the other shaft, said pivotal connections being located with their axes disposed approximately sixty degrees apart.

DAVID NETTENSTROM.